(12) United States Patent
Thompson et al.

(10) Patent No.: US 12,496,645 B1
(45) Date of Patent: Dec. 16, 2025

(54) PIPE SLITTER

(71) Applicant: The Charles Machine Works, Inc., Perry, OK (US)

(72) Inventors: Walter George Thompson, Janesville, WI (US); Mark D. Randa, Oconomowoc, WI (US)

(73) Assignee: The Charles Machines Works, Inc., Perry, OK (US)

( * ) Notice: Subject to any disclaimer, the term of this patent is extended or adjusted under 35 U.S.C. 154(b) by 289 days.

(21) Appl. No.: 18/458,496

(22) Filed: Aug. 30, 2023

Related U.S. Application Data

(60) Provisional application No. 63/403,186, filed on Sep. 1, 2022.

(51) Int. Cl.
| | |
|---|---|
| *B23D 21/02* | (2006.01) |
| *B23D 21/14* | (2006.01) |
| *F16L 1/038* | (2006.01) |
| *F16L 55/165* | (2006.01) |
| *F16L 55/18* | (2006.01) |

(52) U.S. Cl.
CPC ............ *B23D 21/02* (2013.01); *B23D 21/14* (2013.01); *F16L 1/038* (2013.01); *F16L 55/1658* (2013.01); *F16L 55/18* (2013.01)

(58) Field of Classification Search
CPC .......... B23D 21/14; B23D 21/02; F16L 1/038
See application file for complete search history.

(56) References Cited

U.S. PATENT DOCUMENTS

| | | | | |
|---|---|---|---|---|
| 602,301 | A * | 4/1898 | Bramlette | E21B 43/112 166/55.3 |
| 2,151,476 | A * | 3/1939 | Kimble | C08K 5/12 264/28 |
| 4,983,071 | A * | 1/1991 | Fisk | E21B 7/30 405/184.3 |
| 5,098,225 | A * | 3/1992 | Rockower | B23D 21/02 405/184 |
| 5,173,009 | A * | 12/1992 | Moriarty | F16L 55/1658 405/184 |
| 6,305,880 | B1 * | 10/2001 | Carter | F16L 55/1658 405/184.3 |
| 7,086,808 | B2 * | 8/2006 | Wentworth | E21B 7/30 405/184 |
| 9,512,951 | B2 * | 12/2016 | Randa | B23D 21/14 |
| 9,566,653 | B2 * | 2/2017 | Randa | B23D 21/14 |
| D816,456 | S * | 5/2018 | Crane | F16L 55/1658 D8/98 |
| 11,619,336 | B2 * | 4/2023 | Randa | B23D 21/02 405/184.3 |

(Continued)

*Primary Examiner* — Sean M Michalski
(74) *Attorney, Agent, or Firm* — Tomlinson McKinstry, P.C.

(57) ABSTRACT

A pipe slitter assembly for lead pipe. The slitter assembly is configured to be pulled by a cable which is disposed through several of the various components of the assembly. At the lead of the assembly is a slitter, having one and only one blade. The blade has an edge which is oriented at a right angle to the longitudinal axis of the cable. The edge is created by two adjoining walls meeting at an included angle of about 21 degrees. Behind the blade may be various adaptors, and an expander. The expander opens the slit pipe, such that a pipe puller may be used to pull a replacement pipe into the void created by the slitter assembly. The slit pipe may be removed, or left in the subsurface around the newly introduced replacement pipe.

20 Claims, 6 Drawing Sheets

(56) References Cited

U.S. PATENT DOCUMENTS

| | | | |
|---|---|---|---|
| 11,719,375 B1 * | 8/2023 | Herrick | F16L 55/1658 405/184.3 |
| D1,018,244 S * | 3/2024 | Thompson | D8/98 |
| 2004/0050129 A1 * | 3/2004 | Re | B23D 21/006 72/71 |
| 2004/0218982 A1 * | 11/2004 | Wentworth | F16L 55/1658 405/184.3 |
| 2005/0138815 A1 * | 6/2005 | Schmidt | B23D 21/02 30/92.5 |
| 2006/0156879 A1 * | 7/2006 | Koch | B26D 3/001 83/13 |
| 2007/0048091 A1 * | 3/2007 | Tjader | F16L 55/1658 405/184.3 |
| 2011/0079126 A1 * | 4/2011 | Tjader | B23D 21/02 83/178 |
| 2011/0081205 A1 * | 4/2011 | Tjader | F16L 55/1658 405/184.3 |
| 2011/0081206 A1 * | 4/2011 | Tjader | F16L 55/1658 405/184.3 |
| 2011/0150577 A1 * | 6/2011 | Koch | E21B 29/00 405/184.3 |
| 2013/0219670 A1 * | 8/2013 | Tjader | F16L 55/1658 24/115 R |
| 2014/0241812 A1 * | 8/2014 | Herrick | F16B 2/06 405/184 |
| 2015/0098765 A1 * | 4/2015 | Randa | F16L 55/18 405/184.3 |
| 2015/0198279 A1 * | 7/2015 | Randa | B23D 21/14 405/184.3 |
| 2016/0319979 A1 * | 11/2016 | Crane | F16L 55/1658 |
| 2018/0195641 A1 * | 7/2018 | Olander | F16L 1/032 |
| 2021/0107074 A1 * | 4/2021 | Randa | F16L 55/1658 |

* cited by examiner

PIPE SLITTER

SUMMARY

The present invention is directed to a kit. The kit comprises an expander, a jaw assembly, a cable, and a blade assembly. The jaw assembly has a tapered outer surface configured for engagement to an inner surface of the expander. The cable is configured to be attachable to the jaw assembly. The blade assembly comprises a hollow cylinder and one and only one blade extending from an outer surface of the hollow cylinder. The hollow cylinder has a longitudinal axis. The blade comprises an edge.

In another aspect, the invention is directed to a method for replacing an underground pipe. The method comprises placing a cable through the underground pipe and disposing the cable through a blade assembly and an expander. The blade assembly comprises a hollow cylinder and one and only one blade. The hollow cylinder defines a longitudinal axis and the blade comprises an edge which is perpendicular to the longitudinal axis. The method further comprises attaching the cable to one or more jaws within the expander, and, thereafter, pulling the cable through the underground pipe such that the edge slits the underground pipe.

In a third aspect, the invention is directed to a pipe slitter assembly for slitting a pipeline. The assembly comprises a cable and a blade assembly. The blade assembly is disposed about the cable. The blade assembly comprises a cylindrical segment surrounding the cable and axially aligned along a longitudinal axis and one and only one slitter blade. The one and only one slitter blade has an edge oriented at a right angle to the longitudinal axis. The edge of the blade has an included angle substantially equal to 21 degrees.

DETAILED DESCRIPTION

Pipe slitting is a process where an existing buried pipeline is separated longitudinally, expanded open circumferentially along with the surrounding soil and a new pipe is pulled in simultaneously as the slitting and expanding process is performed. Variations on the process include removal of the existing pipe prior to installation of the new (product) pipe; however many projects are performed with the slit host pipe remaining in the bore adjacent the product pipe.

A tensile structure such as a wire rope is pushed or fished through the host pipe and tooling capable of performing the combined slitting/pipe pulling process is attached to one end of the tensile pulling strand. A device capable of applying tension to the strand such as a hydraulic puller or even excavating equipment is coupled to the opposite end. One such pipe puller is disclosed in U.S. Patent Publ. No. 2021/0107074, Randa et al., the contents of which are incorporated herein by reference. A load is applied and the tooling is pulled along the path of the host pipe, through the ground.

Tooling arrangements utilizing slitters and expanders have been used to perform this replacement, such as in U.S. Pat. No. 9,566,653, issued to Randa et al., the contents of which are incorporated herein by reference. Such devices are often used for slitting PVC and other pipes, especially when such pipe is used to convey gas to a structure or dwelling.

However, the prior art does not provide an adequate solution to slitting and expanding (and replacing) lead pipe water lines. Lead pipe was commonly used in residential installations, and in recent years, the continued use of these pipes (even treated version) has been implicated in health issues for those consuming water conveyed in such pipes. Therefore, replacement, rather than coating or treatment, has often been seen as the best option for supplying water to structures with existing lead pipe supply.

Lead pipe water lines require several modifications to design and techniques related to such devices. Lead, being a very soft material, tends to deform about a slitter's blade. Such deformation may result in a blade passing through the deformed pipe, rather than fully slitting it. This deformation make subsequent installation of a replacement pipe more difficult. As a result, the slitter of the attached disclosure is used to overcome the limitations of current designs.

Figure 1:
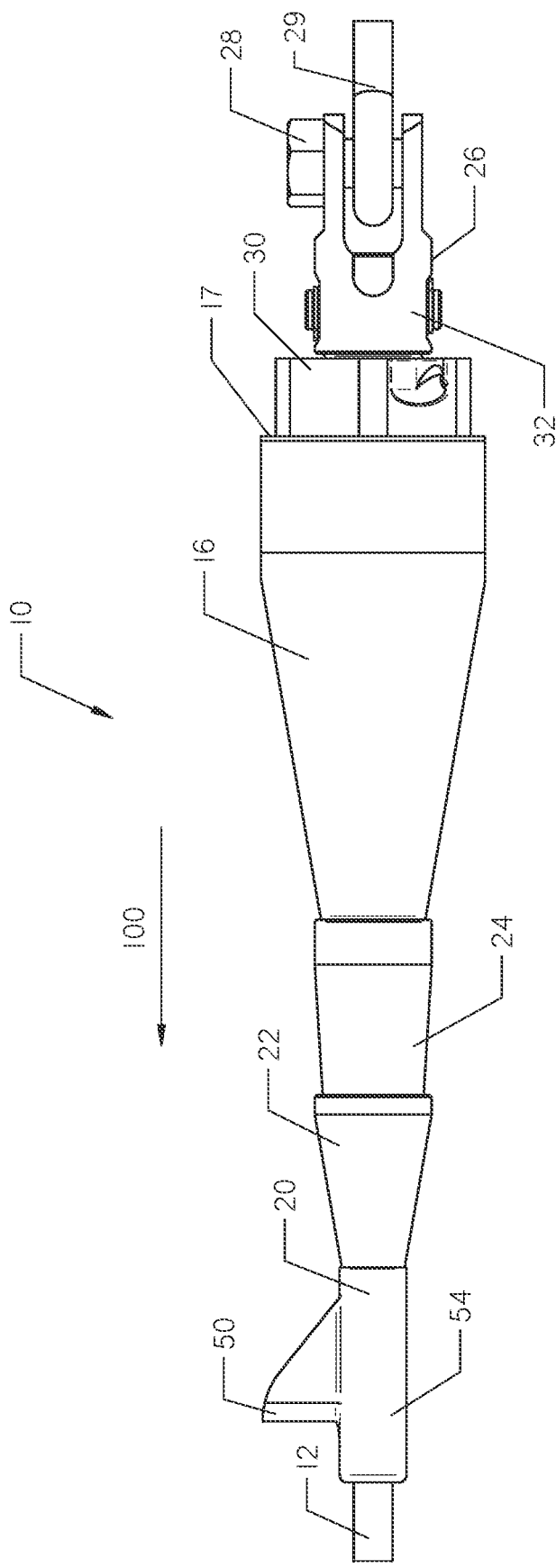
FIG. 1 is a side view of various elements of a kit, used to create a slitting assembly. The assembly is disposed on a cable, and has a shackle at its back (right) end for connection to a pipe puller. From front (left) to back (right) the elements are a blade assembly, cone, separation tube, expander, and a pipe puller.
Figure 2:
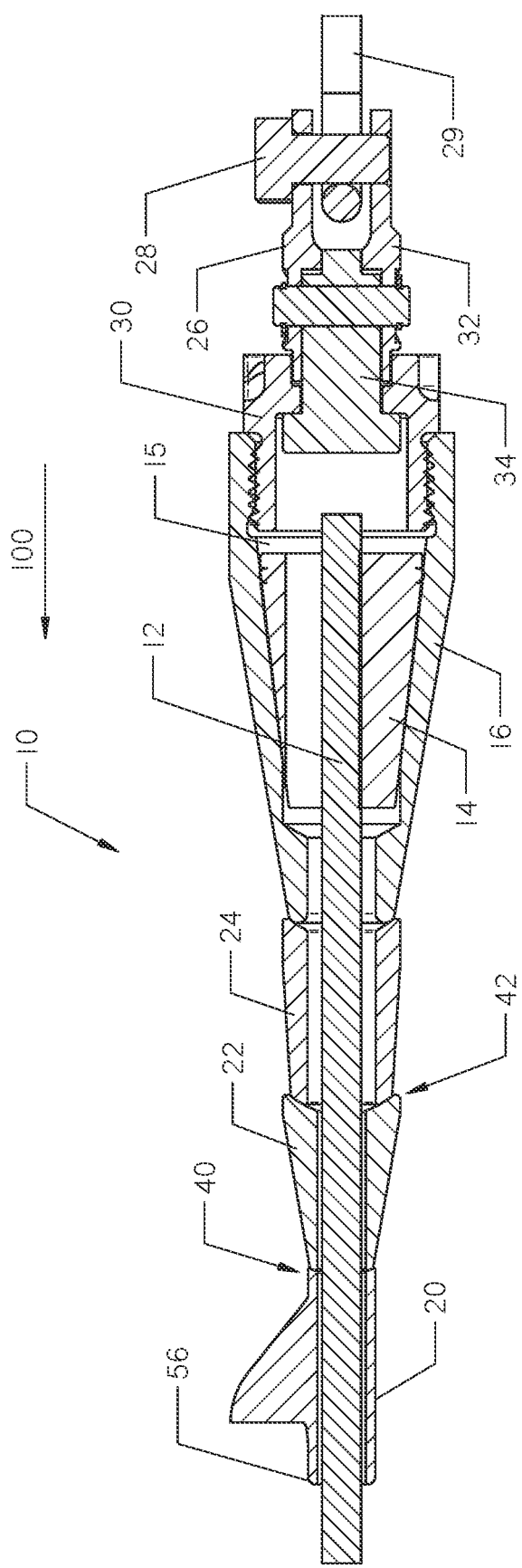
FIG. 2 is a sectional side view of the elements of the kit of claim 1, where the blade assembly, cone, separation tube, and expander are disposed about a cable, and a pipe puller is attached to one end of the expander. A jaw assembly is shown about the cable, and within the expander assembly.

Turning now to FIGS. 1 and 2, a pipe slitter assembly 10 for use in slitting and replacing a pipeline 70 (FIG. 6), specifically a pipeline made of lead, is shown. The slitter assembly 10 is disposed about a cable 12, which extends through the assembly 10 and imparts a force upon it. Typically, the cable will be attached to the assembly through tapered jaws which are incorporated within a hollow region of one of the elements. As shown, the tapered jaws 14 are within a cavity 15 of an expander 16. As the cable 12 is pulled in direction 100, the jaws 14 are forced towards the smaller end of the cavity 15 of the expander 16, forcing them to grip the cable 12. In this way, the jaws tighten as the assembly 10 is being pulled through the existing pipe 70.

The slitter assembly 10 shown in FIGS. 1 and 2 comprises a blade assembly 20, a cone 22, a separation tube 24, and the expander 16. The expander 16 is at the back of the slitting apparatus 10 relative to the direction 100 in which the cable (and thus the assembly 10) is pulled through the pipe 70. After the pipe 70 is slit and forced around the larger outer diameter of the expander 16, it has a larger effective diameter with a void inside, characterized by portion 72 in FIG. 6.

A rear end 17 of the expander 16 is attached to a pipe puller 26. The pipe puller 26 may have a shackle 28 which allows the assembly to pivot relative to a replacement pipe 74. In addition, the pipe puller 26 may comprise a threaded first section 30 which is threaded to the expander 16, and a second section 32 attached to the first section 30 by a bolt 34. This bolt 34 may rotate within the first section 30 along the axis of the slitter assembly 10. The new pipe 74 is thus installed within the slit, expanded pipe 72 as the assembly 10 advances.

The shackle 28 allows for attachment to a second cable 29 which pulls new pipe (not shown) into the void created by the slitting assembly 10. Alternatively, the pipe puller 26 may be directly connected to the new pipe 74. If an existing pipe 70 is being slit without installation of a new pipe, the pipe puller is not necessary.

Figure 6:
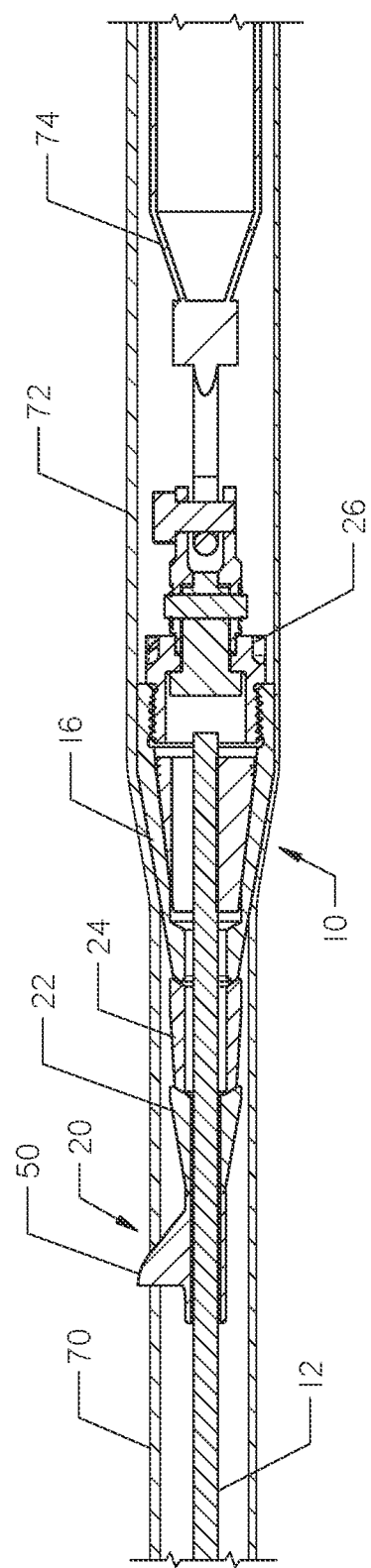
FIG. 6 is a side cross-sectional view of the assembly within an existing pipe. The existing pipe is slit by the slitter and expanded. A pipe puller pulls a new pipe into a void created by the expander.

As shown in FIGS. 2 and 6, the cable 12 is disposed through a portion of the expander 16, as well as the length of each of the separation tube 24, cone 22, and blade assembly 20. Each of these elements cooperate with one another to slit and open the existing pipe 70. The blade assembly 20 cuts the pipe longitudinally. The blade assembly 20 chosen may have a small interface 40 for an abutting nose (such as a front end of the cone 22), as best seen in FIG. 2. The cone 22 operates as an adaptor between the blade assembly 20 and other elements, engaging at its rear end with a standard size interface 42 of the separation tube 24 or expander 16. The cone 22 thus allows smaller diameter blade assemblies 20 to be used, and cones 22 may be selected to engage with a particular blade assembly 20.

The separation tube 24 may be utilized in some applications of the slitter assembly 10. The length of the separation tube 24 spaces the expander 16 from the blade assembly 20. This separation may be important if, for example, the large diameter of the expander 16 would tend to cause deformation in the pipe 70 forward of the expander 16. Such deformation may be forced up the pipe (in direction 100) a region of the pipe which is in front of the blade assembly 10. This deformation may impact the ability of the blade assembly 10 to slit the pipe 70. By longitudinally displacing the expander 16 from the blade assembly 10, the expander 16 can open the inner diameter of a fully slit pipe 72 without impacting the slitting operation itself. The length of the separation tube 24 may vary depending upon the material of the existing pipe 70 and its diameter.

The expander 16 opens the slit existing pipe 70 enough that a replacement pipe 74 can be pulled behind by a pipe puller. In some scenarios, the expanded existing pipe 72 is left in the ground, with the replacement pipe 74 along the former path of the replaced and expanded pipe. Alternatively, the existing pipe may be pulled from the ground and disposed of appropriately.

Figure 3:
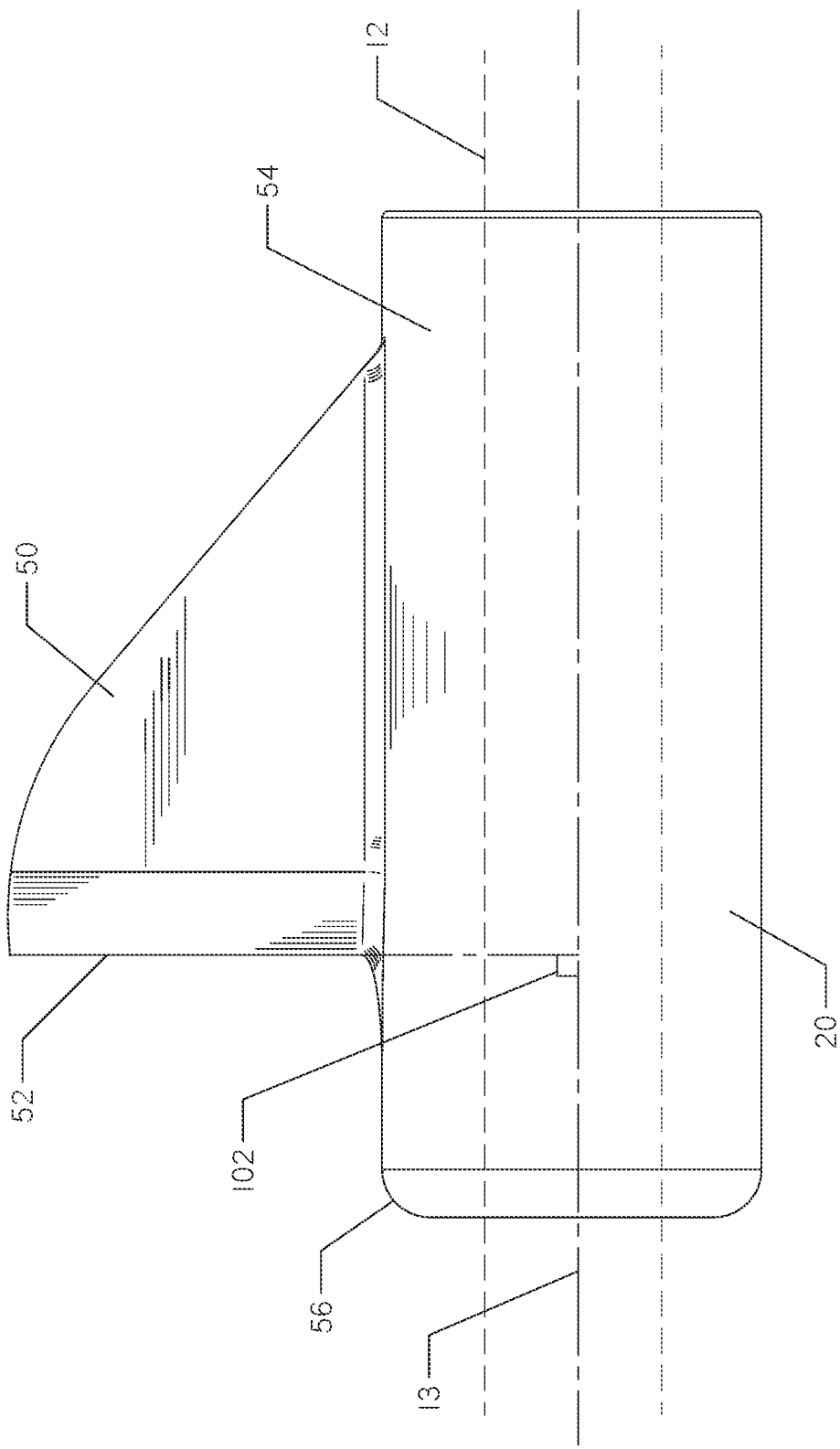
FIG. 3 is a side view of a blade assembly. A cable is shown disposed within the blade assembly, in dashed lines where the cable passes through the hollow cylinder of the blade assembly.
Figure 4:
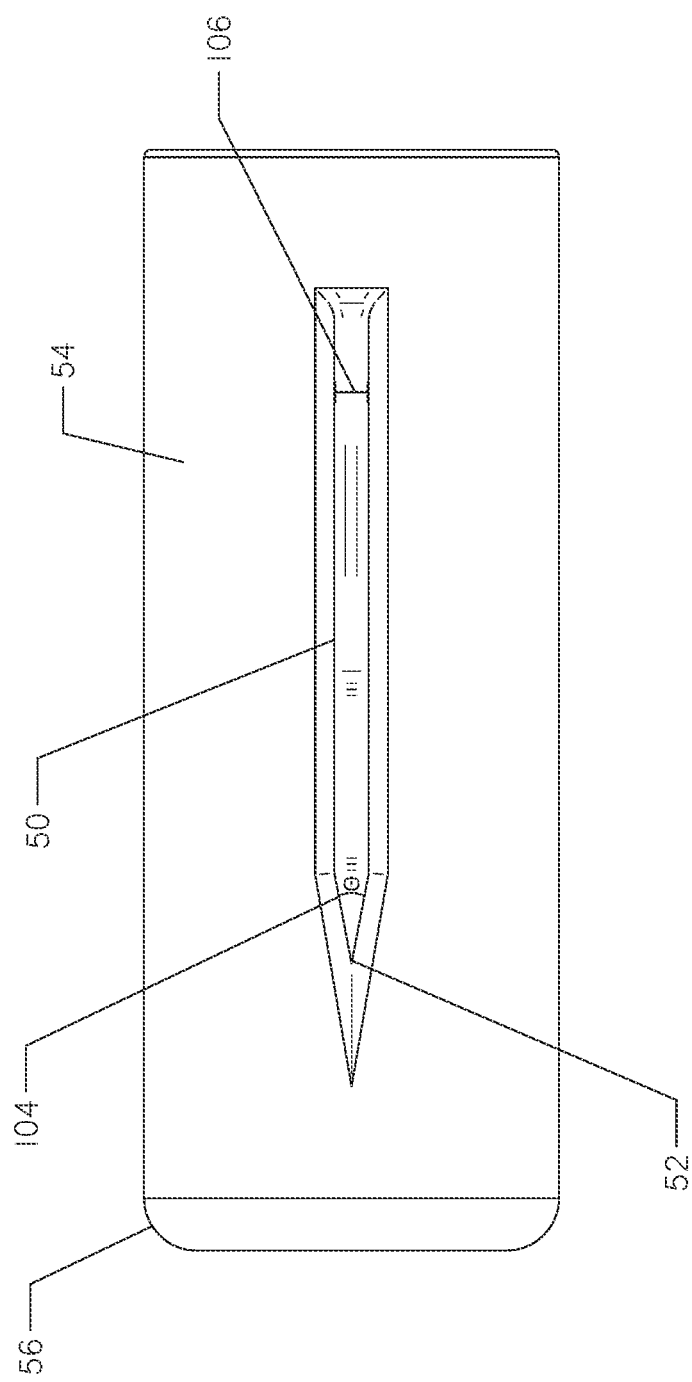
FIG. 4 is a top view of the blade assembly, with the width of the blade and included angle of the edge portion of the blade shown.
Figure 5:
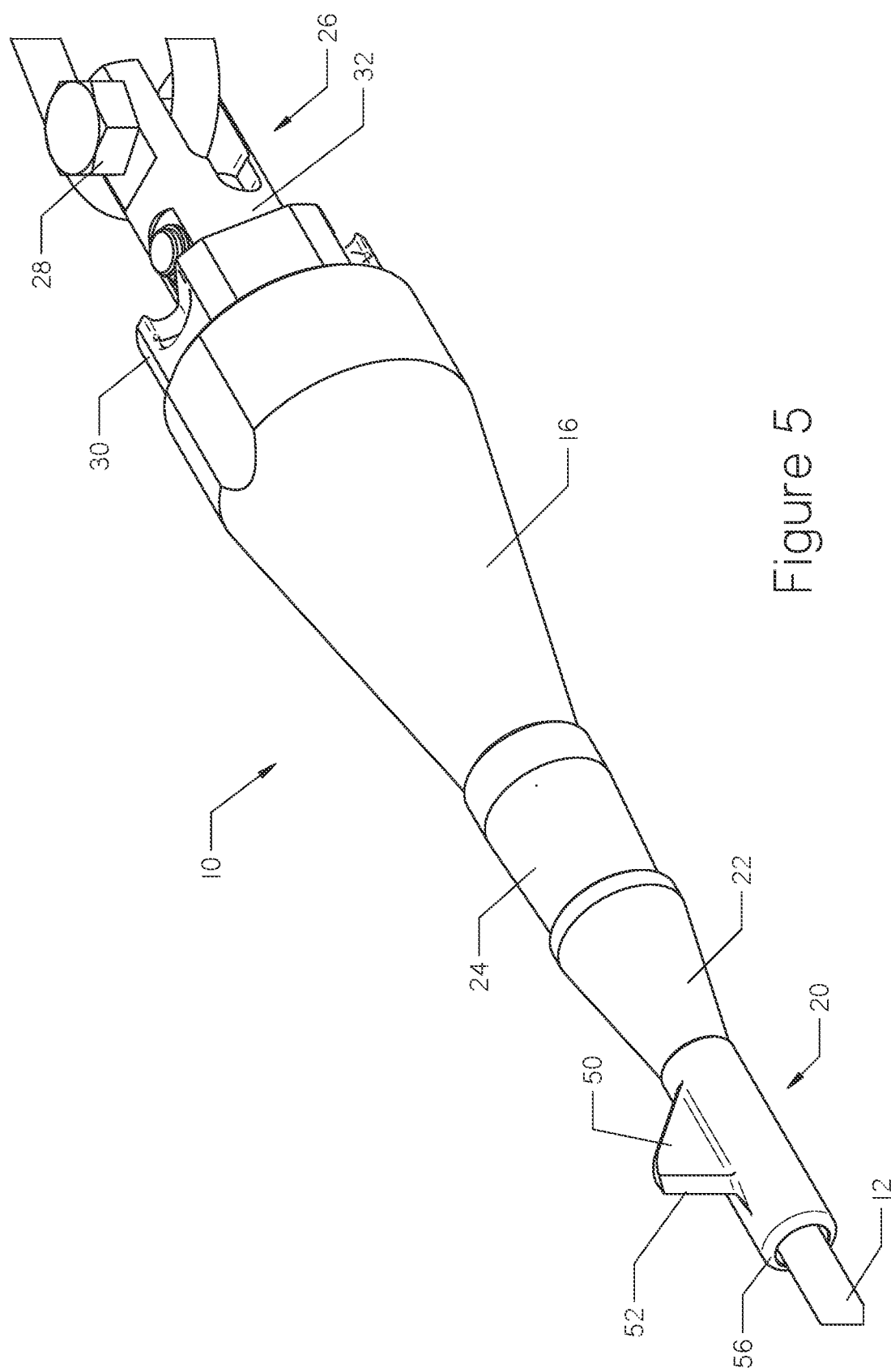
FIG. 5 is a top front side perspective view of the assembly of FIG. 1.

With reference to FIGS. 3-4, the blade assembly 20 is shown in detail. Unlike common slitters, which have a plurality of blades disposed about the perimeter of a cylindrical segment such that forces are distributed evenly on the existing pipe, the present blade has one, and only one, slitter blade 50 extending from a cylindrical segment 54. In addition, the one and only one slitter blade 50 has an edge 52 which is at a right angle 102 to the direction of travel 100 of the apparatus—that is, perpendicular to a longitudinal axis 13 of the cable 12 and the various portions of the slitting apparatus 10 that the cable 12 pulls.

The cylindrical segment 54 has a section which supports the blade 50, and a nose 56 extending about the cable 12 in front of the blade 50. This nose 56 is radiused to prevent the nose 56 from catching on a portion of the existing pipe. Further, its length prevents the slitting assembly 10 in general, and the blade 50 in particular, from angling relative to the pipe. Rather, the cable 12 (within the cylindrical segment 54) and the pipe (about the cylindrical segment 54 and in front of the blade 50) center the longitudinal axis 13 of the cable 12 along (or parallel to) the axis of the existing pipe.

In operation, the point of contact of the blade 50 with the existing pipe 70 is a line that is perpendicular to the pipe's longitudinal axis—situated at right angle 102. In this way, the entire thickness of the pipe 70, from inner diameter to outer diameter, is sliced at once, rather than gradually. Because the height of the edge 52, when added to the radius of the cylindrical segment 54 on which it is disposed, is greater than the outside radius of the existing pipe, the existing pipe 70 transitions from whole, to completely slit, all at once with reference to a position along the pipe's length. In lead pipe, or other soft pipe applications, such a complete slice is preferable to gradually slitting the pipe with a tapered blade. A tapered blade, as is known in the art, may be better for harder materials that are more difficult to cut but also less apt to deform. The blade 50 situated at right angle 102 prevents deformation and makes a clean slit of the existing pipe more likely.

The edge 52 of the blade 50 has an included angle 104, shown best in FIG. 4, substantially equal to 21 degrees. It should be understood that when "substantially equal" is used in the specification and claims, a tolerance of one degree is allowed—thus, an angle of 20 degrees would be substantially equal to 21 degrees, while 19 degrees will not. It is feasible for the included angle 104 to be as large as 24 degrees or as small as 18 degrees, though 21 degrees is preferred as discussed below.

Unlike other pipe materials, lead pipe is very soft, and prone to crushing. As a result, larger included angles for blades may cause the blade to push, rather than slice, the pipe. Too much force, without slicing, may cause the existing lead pipe to crush, forming an "accordion-like" structure, making further slitting of the existing pipe impossible. However, smaller included blades create long thin blade structures which may not fit properly on the cylindrical segment.

In addition, the maximum width 106 of the blade 50 may vary to meet the requirements of the existing pipe being slit. In practice, larger widths 106 make for stronger blades 50, but also may tend to crush the pipe. In addition, excessive opening of the pipe about the width 106 of the blade 50 may result in deformation of the pipe in front of the blade's edge 52. Therefore, the blade's maximum width 106 should be increased to accommodate thicker pipe wall and larger inner diameter pipe, while keeping the included angle 104 of the blade substantially equal to 21 degrees. Thus, larger width 106 blades 50 will have longer tapers from the edge to the maximum width.

Changes may be made in the construction, operation and arrangement of the various parts, elements, steps and procedures described herein without departing from the spirit and scope of the invention as described in the following claims.

The invention claimed is:

1. A kit comprising: an expander configured to spread a pipe; a jaw assembly having a tapered outer surface configured for engagement to an inner surface of the expander; a cable configured to be attachable to the jaw assembly; and a blade assembly spaced longitudinally forward of said expander, and comprising: a hollow cylinder having a longitudinal axis; and one and only one blade extending from an outer surface of the hollow cylinder, the blade comprising a linear edge for cutting being perpendicular to a longitudinal axis of said cable.

2. The kit of claim 1 in which the cable is attached to the jaw assembly and the jaw assembly is disposed inside the expander, wherein the cable is disposed within the hollow cylinder of the blade assembly.

3. The kit of claim 2 further comprising a hollow separation tube disposed between the expander and the blade assembly, wherein the cable is disposed within the hollow separation tube.

4. The kit of claim 1 wherein: the linear edge is formed by two opposing sides which meet at an included angle of 18-24 degrees.

5. The kit of claim 4 in which the included angle is between 20 and 22 degrees.

6. The kit of claim 5 in which the included angle is substantially 21 degrees.

7. The kit of claim 1 in which the linear edge is perpendicular to the longitudinal axis of the hollow cylinder.

8. A method for replacing an underground pipe, comprising: placing a cable through the underground pipe; disposing the cable through a blade assembly and an expander which are longitudinally spaced from one another, wherein the blade assembly comprises a hollow cylinder and one and only one blade, wherein the hollow cylinder defines a longitudinal axis and the blade comprises a linear edge which is perpendicular to the longitudinal axis; attaching the cable to one or more jaws within the expander; and thereafter, pulling the cable through the underground pipe such that the linear edge slits the underground pipe.

9. The method of claim 8 further comprising:
disposing the cable through a separation tube, wherein the separation tube is disposed between the blade assembly and the expander.

10. The method of claim 8 further comprising:
attaching the expander to a pipe puller; and
attaching the pipe puller to a replacement pipe.

11. The method of claim 8 in which the hollow cylinder comprises a radiused nose.

12. The method of claim 8 in which the linear edge is formed by two opposing sides which meet at an included angle of 18 to 24 degrees.

13. A pipe slitter assembly for slitting a pipeline, comprising: a cable; and a blade assembly disposed about the cable, wherein the blade assembly comprises: a cylindrical segment surrounding the cable and axially aligned along a longitudinal axis, and one and only one slitter blade extending from the cylindrical segment, the slitter blade having a linear cutting edge oriented at a right angle to the longitudinal axis, and wherein the edge of the blade is longitudinally spaced from a pipe expander, and has an included angle substantially equal to 21 degrees.

14. The pipe slitter of claim 13, wherein the expander has a cavity and an outer diameter greater than an outer diameter of the cylindrical segment of the blade assembly.

15. The pipe slitter assembly of claim 14, wherein the assembly further comprises tapered jaws located within the cavity of the expander, the jaws configured to couple with the cable and to abut an inner surface of the expander while coupled to the cable.

16. The pipe slitter assembly of claim 14, further comprising a separation tube disposed between the blade assembly and the expander, and about the cable.

17. The pipe slitter assembly of claim 14, further comprising a pipe puller connected to the expander, said pipe puller being adapted to attach to a new pipeline.

18. The pipe slitter assembly of claim 15, further comprising:
a pipe puller connected to the expander, the pipe puller being adapted to attach to a new pipeline;
a separation tube disposed between the blade assembly and the expander and disposed about the cable; and
a cone positioned between the blade assembly and the separation tube and disposed about the cable.

19. A system, comprising:
a pipeline made of lead; and
the pipe slitter assembly of claim 13, wherein the blade assembly is configured to slit the lead pipeline as the assembly is pulled through the pipeline via the cable.

20. The pipe slitter assembly of claim 13, wherein the cylindrical segment includes a nose positioned in front of the slitter blade.

\* \* \* \* \*